United States Patent
Diguet et al.

(10) Patent No.: US 11,275,870 B2
(45) Date of Patent: Mar. 15, 2022

(54) DESIGNING AN ASSEMBLY OF PARTS IN A THREE-DIMENSIONAL SCENE

(71) Applicant: Dassault Systemes, Velizy Villacoublay (FR)

(72) Inventors: Michaël Eric Francois Diguet, Meudon (FR); Marc Nusinovici, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 1149 days.

(21) Appl. No.: 14/108,058

(22) Filed: Dec. 16, 2013

(65) Prior Publication Data

US 2014/0180646 A1   Jun. 26, 2014

(30) Foreign Application Priority Data

Dec. 20, 2012   (EP) .................................... 12306645

(51) Int. Cl.
*G06F 30/00*   (2020.01)
*G06F 111/04*   (2020.01)

(52) U.S. Cl.
CPC .......... *G06F 30/00* (2020.01); *G06F 2111/04* (2020.01)

(58) Field of Classification Search
CPC ............ G02B 5/32; G06K 2207/1012; G06K 7/10673; G06K 7/10792; G06F 17/50; G06F 2217/06; G06F 17/5086; G06F 2217/02; G06F 2217/04; G06T 19/20; G06T 2219/2004
USPC .................. 707/601, 634, 694, 701–702, 793
See application file for complete search history.

(56) References Cited

U.S. PATENT DOCUMENTS

| | | | | |
|---|---|---|---|---|
| 5,980,084 A | * | 11/1999 | Jones | G05B 19/41805 700/95 |
| 6,016,147 A | * | 1/2000 | Gantt | G06F 17/50 345/419 |
| 6,725,184 B1 | * | 4/2004 | Gadh | G05B 19/41805 703/2 |
| 7,062,341 B1 | * | 6/2006 | Karaikurichi | G06T 17/00 700/103 |
| 7,483,923 B2 | * | 1/2009 | Novik | H04L 29/06 |

(Continued)

OTHER PUBLICATIONS

Zhenyu Liu et al: "Constrained Behaviour Manipulation for Interactive Assembly in a Virtual Environment," The International Journal of Advanced Manufacturing Technology, Springer, Berlin, DE, vol. 32, No. 7-8, Mar. 30, 2006 (Mar. 30, 2006), pp. 797-810, XP019488097.

(Continued)

*Primary Examiner* — Alex Gofman
*Assistant Examiner* — Linh Black
(74) *Attorney, Agent, or Firm* — Hamilton, Brook, Smith & Reynolds, P.C.

(57) ABSTRACT

It is proposed a computer-implemented method for designing an assembly of parts in a three-dimensional scene. The method comprises:
  providing at least a first part and a second part, the parts being stored in a database;
  for each part:
    (i) querying in the database for one or more constraints applied to the part;
    (ii) retrieving in the database geometries on which constraints are applied;
  computing at least one relative position of the first part and the second part by using the retrieved geometries.

12 Claims, 3 Drawing Sheets

(56) References Cited

U.S. PATENT DOCUMENTS

| | | | |
|---|---|---|---|
| 8,145,671 B2* | 3/2012 | Rizzolo | G06Q 10/0635 |
| | | | 707/790 |
| 8,896,597 B2* | 11/2014 | Staples | G06F 30/00 |
| | | | 345/420 |
| 9,639,655 B2* | 5/2017 | Storms | G06F 30/17 |
| 2002/0107673 A1* | 8/2002 | Haller | G05B 19/41805 |
| | | | 703/1 |
| 2003/0067487 A1* | 4/2003 | Kohls | G06T 17/10 |
| | | | 715/764 |
| 2003/0126038 A1* | 7/2003 | Lukis | B29C 33/3835 |
| | | | 700/200 |
| 2005/0071135 A1* | 3/2005 | Vredenburgh | G06F 17/5004 |
| | | | 703/1 |
| 2005/0188348 A1* | 8/2005 | Han | G06T 17/10 |
| | | | 717/105 |
| 2006/0106757 A1* | 5/2006 | Sakai | G05B 19/4097 |
| 2006/0136842 A1* | 6/2006 | Charles | G06F 16/25 |
| | | | 715/825 |
| 2006/0178862 A1* | 8/2006 | Chan | G06F 30/00 |
| | | | 703/11 |
| 2007/0063378 A1* | 3/2007 | O'Donoghue | B29C 33/40 |
| | | | 264/219 |
| 2007/0198951 A1* | 8/2007 | Frank | G06F 17/30017 |
| | | | 715/838 |
| 2008/0162091 A1* | 7/2008 | Lechine | G06F 17/50 |
| | | | 703/1 |
| 2008/0172208 A1* | 7/2008 | Lechine | G06F 17/50 |
| | | | 703/1 |
| 2008/0276184 A1* | 11/2008 | Buffet | G06Q 10/10 |
| | | | 715/752 |
| 2009/0033656 A1* | 2/2009 | Larkins | G06T 17/00 |
| | | | 345/419 |
| 2009/0259442 A1* | 10/2009 | Gandikota | G06F 30/00 |
| | | | 703/1 |
| 2010/0274818 A1* | 10/2010 | Chauvin | G06F 16/9024 |
| | | | 707/803 |
| 2011/0098837 A1* | 4/2011 | Yucel | G06F 17/5086 |
| | | | 700/104 |
| 2012/0158369 A1* | 6/2012 | Bachrach | G06F 17/50 |
| | | | 703/1 |
| 2013/0080121 A1* | 3/2013 | Gibson | G06F 17/50 |
| | | | 703/1 |
| 2013/0132042 A1* | 5/2013 | Chan | G06N 3/126 |
| | | | 703/1 |

OTHER PUBLICATIONS

Bier E A: "Snap-Dragging in Three Dimensions," Proceedings Symposium on Interactive 3D Graphics, New York, NY, US, vol. 24, No. 2, Mar. 25, 1990 (Mar. 25, 1990).

Yingxtan Fa et al: "Interactive Constraint-Based Solid Modeling Using Allowable Motion," Proceedings on the Second ACM Symposium on Solid Modeling and Applications, SMA'93, Jan. 1, 1993 (Jan. 1, 1993), pp. 243-252, XP055000412.

European Search Report for European Application No. 12 30 6645, dated Apr. 23, 2013.

\* cited by examiner

DESIGNING AN ASSEMBLY OF PARTS IN A THREE-DIMENSIONAL SCENE

RELATED APPLICATION(S)

This application claims priority under 35 U.S.C. § 119 or 365 to European Application No. 12306645.8, filed Dec. 20, 2012.

The entire teachings of the above application(s) are incorporated herein by reference.

FIELD OF THE INVENTION

The invention relates to the fields of the field of designing of an assembly of parts on which constraints are applied.

BACKGROUND OF THE INVENTION

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Current CAD applications allow the user to define spatial relationships between the parts (or objects) of an assembly of objects, e.g. between two products of an assembly of objects. Typically, and as known in the art, the user is a designer who moves an object relatively to another object in order to place the object at a specific position. For instance, the designer may wish to place a screw through a hole comprised in a plate. To this aim, the designer selects and moves the screw on the plate until a rough approximate of the desired position of the screw relatively to the hole of the plate is reached. Then, mating properties of the screw and the plate are used to find a position of the screw relatively to the plate, the position being determined according to the location of the screw provided by the designer.

However, positioning an object relatively to another is a difficult and cumbersome task for the designer because the designer has to move the first object over the second one (or parts of them) at the right place, and the first and second object may be really small; for instance, a part of an object may be like a point.

Existing solutions provide tools to define geometrical constraints by manual selection of constraint type and hooking points; a hooking point being a geometry of a part on which a constraint is to be applied. For example positioning a screw on a planar holed plate requires coincidence constraint between screw axis and plate hole axis and contact constraint between screw head surface and plate surface.

Moreover, other solutions further provide a tool to "publish" geometrical elements on a given part. So called "publications" can be a way to identify preferred hooking point. Indeed the constraints definition process can be simplified by restricting the number of possible constraint hooking points to the publications.

However, the publication of hooking points has some drawbacks. First, publications introduce an additional time-consuming step in the design process. This additional step is often an inhibitor to the deployment of publications based methodology. Second, the publication step has to be performed prior to the positioning step, which is not convenient because design and positioning are often performed by different users; in particular, access authorizations may be an inhibitor for deploying publications of hooking points in a collaborative environment. Third, for a company using CAD software product, the same part is frequently reused many times in multiple assemblies and products and is usually connected through a limited number of hooking points. The user needs to create same or similar connections many times, making the connection process time costly and repetitive.

Thus, according to the limitations of the existing solutions shortly discussed above, there is a need for improving the designing an assembly of parts in a three-dimensional scene in an easier and faster ways.

SUMMARY OF THE INVENTION

The object of the present invention is to alleviate at least partly the above mentioned drawbacks.

According to one aspect, the invention therefore provides a computer-implemented method for designing an assembly of parts in a three-dimensional scene. The method comprises the steps of:
  providing at least a first part and a second part, the parts being stored in a database;
  for each part: (i) querying in the database for one or more constraints applied to the part; (ii) retrieving in the database geometries on which constraints are applied;
  computing at least one relative position of the first part and the second part by using the retrieved geometries.
The method may comprise one or more of the following:
  the step of computing at least one relative position comprises computing at least one constraint of the first part and the second part by using the retrieved geometries and by using a constraint type of the one or more constraints queried in the database for said each part;
  the step of providing comprises selecting, upon user action, said at least first and second parts;
  the selection of said at least first and second parts is performed upon a user action on a haptic device;
  the selection of said at least first and second parts comprises: selecting the first part upon a user action on a haptic device; selecting the second part by hovering the selected first part that is dragged by the user over the second part;

the said one or more constraints stored in the database comprise at least: a type; a value; a geometry of a part supporting the constraint.

The invention further proposes a computer program comprising instructions for execution by a computer, the instructions comprising means for performing the steps of the method of one of invention.

The invention further proposes a computer readable storage medium having recorded thereon the above computer program.

The invention further proposes a computerized design system comprising:
- a storage system for storing at least a first part and a second part;
- a computing unit performing the steps of the invention.

The computerized design system may comprise one or more of the following:
- a haptic device for performing the selection of a part according to the invention;
- a display for displaying an assembly of parts in a three-dimensional scene that comprises at least said first and second parts.

Further features and advantages of the invention will appear from the following description of embodiments of the invention, given as non-limiting examples, with reference to the accompanying drawings listed hereunder.

BRIEF DESCRIPTION OF THE DRAWINGS

Examples of embodiments of the invention will now be described, by way of non-limiting example, and in reference to the accompanying drawings, where.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
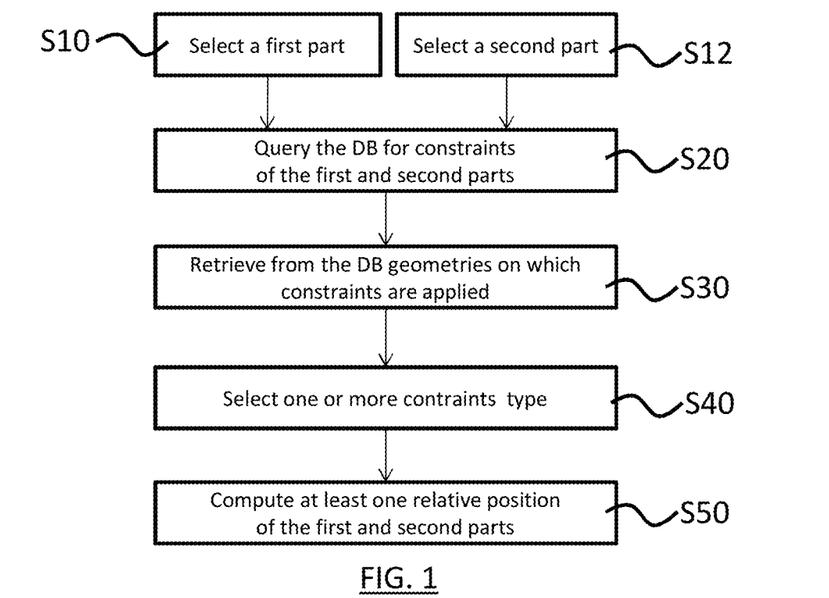
FIG. 1 shows an example of a flowchart of an embodiment of the method.

With reference to the flowchart of FIG. 1, it is proposed a computer-implemented method for designing an assembly of parts in a three-dimensional scene. Such a method makes easier and faster the designing of an assembly of parts in a three-dimensional scene.

The method is computer-implemented. This means that the steps (or substantially all the steps) of the method are executed by at least one computer. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the step of computing may be triggered upon user action in the 3D scene, e.g. on a graphical tool displayed in a GUI wherein the 3D scene is shown.

A typical example of computer-implementation of the method is to perform the method with a system comprising a graphical user interface (GUI) suitable for this purpose. The GUI is coupled with a memory and a processor. The memory, which stores a database, is merely any hardware suitable for such storage.

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the database stores at least a first part and a second part, e.g. 3D modeled objects.

The method generally manipulates modeled objects that are also referred to as parts. A modeled object is any object defined by data stored in the database. By extension, the expression "modeled object" designates the data itself. According to the type of the system, the modeled objects may be defined by different kinds of data. The system may indeed be any combination of a CAD system, a CAE system, a CAM system, and/or a PLM system. In those different systems, modeled objects are defined by corresponding data. One may accordingly speak of CAD object, PLM object, CAE object, CAM object, CAD data, PLM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below. The modeled objects or parts may be mechanical parts. A mechanical part is a part on which apply the principles of physics and materials science for analysis, design, manufacturing, and maintenance of mechanical systems.

By CAD system, it is meant any system suitable at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is meant any system suitable for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

By CAE system, it is meant any system suitable for the analysis of the physical behaviour of a modeled object. In a CAE system, a modeled object is thus defined by data suitable for the analysis of such behavior. This may be typically a set of behavioring features. For instance, a modeled object corresponding to a door may be defined by data indicating that the door rotates around an axis.

Figure 9:
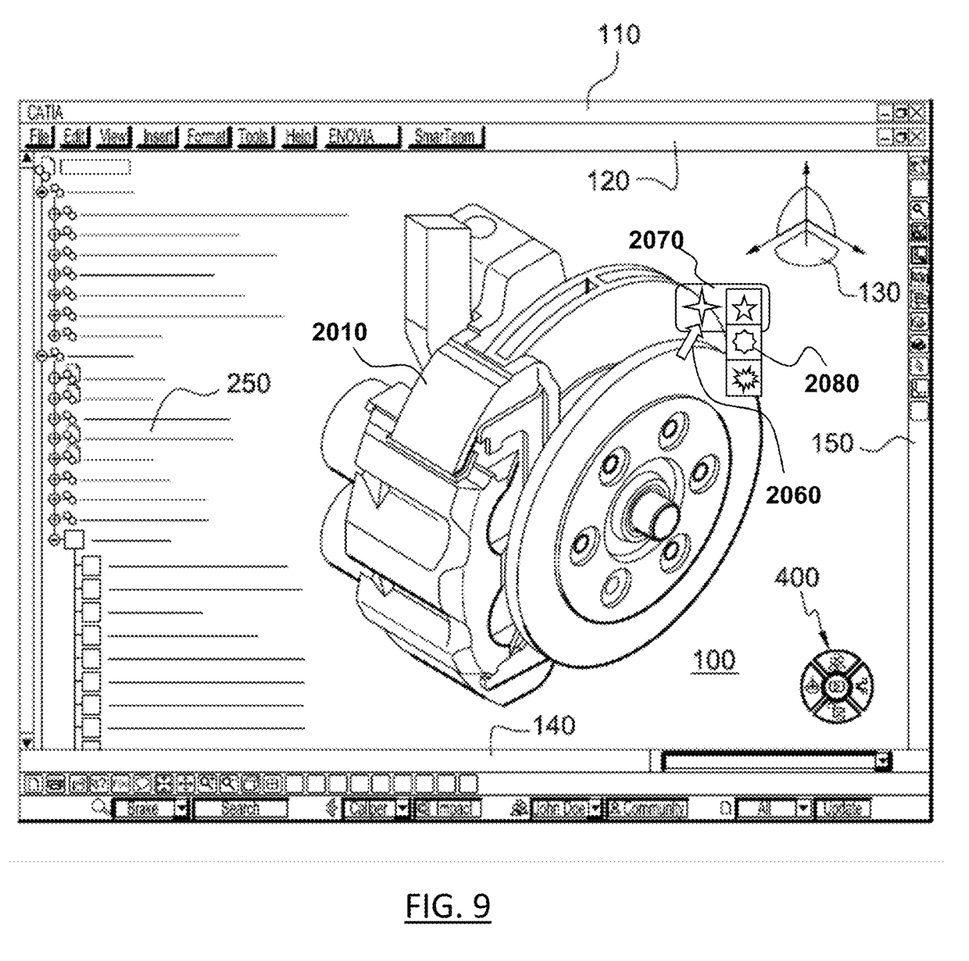
FIG. 9 shows an example of a graphical user interface of a computerized design system.

FIG. 9 shows an example of the GUI of the system, wherein the system is a CAD system.

The GUI 100 may be a typical CAD-like interface, having standard menu bars 110, 120, as well as bottom and side toolbars 140, 150. Such menu- and toolbars contain a set of user-selectable icons, each icon being associated with one or more operations or functions, as known in the art. Some of these icons are associated with software tools, adapted for editing and/or working on the 3D modeled object 2010 displayed in the GUI 100. The software tools may be grouped into workbenches. Each workbench comprises a subset of software tools. In particular, one of the workbenches is an edition workbench, suitable for editing geometrical features of the modeled product 2010. In operation, a designer may for example pre-select a part of the object 2010 and then initiate an operation (e.g. change the dimension, color, etc.) or edit geometrical constraints by selecting an appropriate icon. For example, typical CAD operations are the modeling of the punching or the folding of the 3D modeled object displayed on the screen.

The GUI may for example display data 250 related to the displayed product 2010. In the example of FIG. 9, the data 250, displayed as a "feature tree", and their 3D representation 2010 pertain to a brake assembly including brake caliper and disc. The GUI may further show various types of graphic tools 130, 400, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 10:
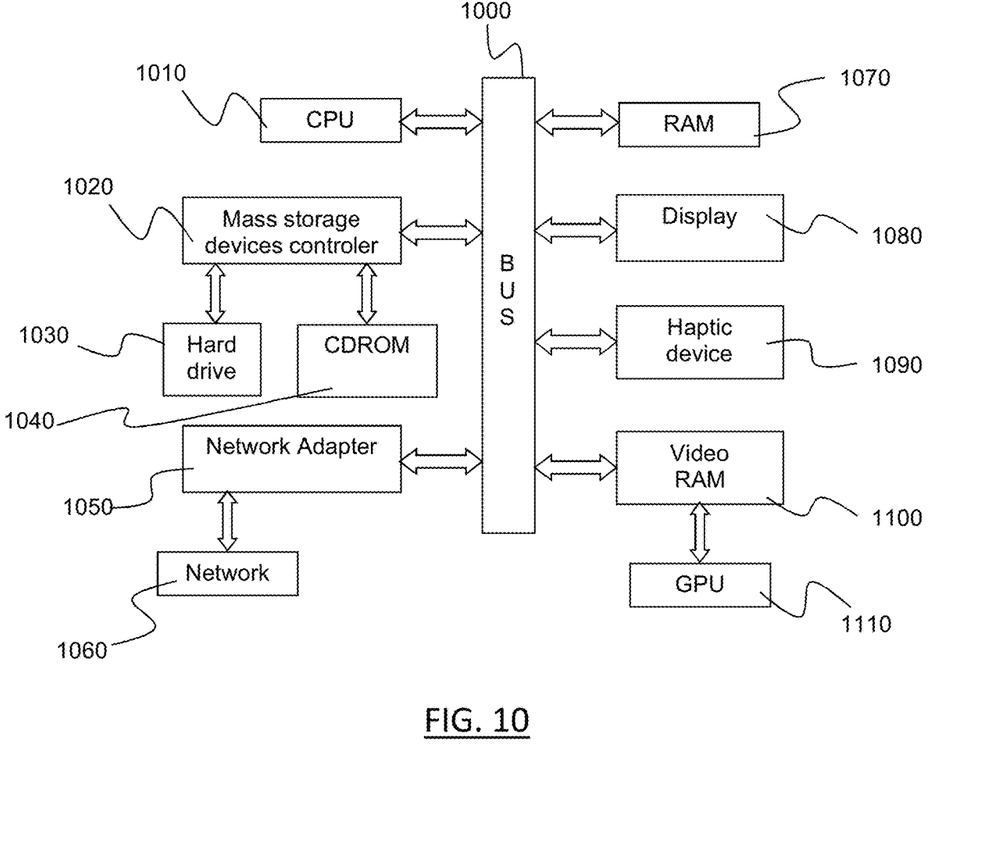
FIG. 10 shows an example of a computerized design system.

FIG. 10 shows a computerized design system, e.g. a computer system such as a workstation of a designer.

The computer system comprises a central processing unit (CPU) 1010 connected to an internal communication BUS 1000, a random access memory (RAM) 1070 also connected to the BUS. The computer system is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The computer system may also include a haptic device 1090 such as cursor control device, a keyboard or the like. A cursor control device is used in the computer system to permit the user to selectively position a cursor at any desired location on display 1080, as mentioned with reference to FIG. 9. In addition, the cursor control device allows the user to select various commands, and input control signals. The cursor control device includes a number of signal generation devices for input control signals to system. Typically, a cursor control device may be a mouse, the button of the mouse being used to generate the signals.

Referring back to FIG. 1, at steps S10 and S12, it is provided at least a first part and a second part. The parts are stored in a database. Providing the parts means that respective data of the parts are available to the computerized design system carrying out the method of the invention. This amounts to say that respective data of the first and second parts are provided to a scene run by the system carrying out the method of the invention. Said otherwise, the first and second parts are loaded in the 3D scene. Providing the first and second parts may be the result of a two consecutive steps of searching in the database and retrieving from the database of respective data of the first and second parts.

The first and second parts may be automatically provided by the system, e.g. parts that were used in a former design session, a session being a time period during which the user interacts at least one time with the computerized design system. In practice, the user logs on to the system each time he/she wants to perform a design, and the former design session may loaded when the user logs in.

Alternatively, the first and second parts may be provided as the result of a selection performed upon user action. The user may carry out the selection via a haptic device such as a keyboard, a mouse, a stylus, a touch sensitive display, or the like. For instance, in a two-button mouse, the left button could be used for selecting the first and/or the second part. The selection may be performed, but not limited to, into a list of parts, wherein the list may be a textual list or a list of 2D or 3D representations of the parts.

As another alternative, the first and second parts may be provided upon user actions, wherein the user selects the first part upon user action on a haptic device and selects the second part by hovering the selected first part over the second part: the first part is dragged and moved over the second one. Hovering the selected first part over the second part means that the first part is positioned both vertically and relative to a surface of a display displaying the representations of the parts. Said otherwise, the first part is suspended over the second one both vertically and relative to the surface of the display. The selection of the second part may be triggered once the first part is suspended over the second one during a predetermined time, e.g. 1 second. The first part may be determined as hovering the second part when a predetermined minimal surface of the first part is over the second one, e.g. a predetermined number of pixels. In practice, a cursor that indicates a position on the display is placed on the first part for selecting the first part, e.g. upon action on the left button of a two-button mouse, and the first part is moved toward the second object until the first object hovers the second one.

It is to be understood that the first and second parts may be selected differently. For instance, the first part may be automatically selected by the system, and the second part may be selected upon user action. As another example, the selection of the second part may be immediately triggered as soon as the first part is suspended over the second one.

At this step of the process, a first and second parts have been provided to the system. Next, at step S20, and for each provided part at steps S10 and S12, a query is performed in the database for one or more constraints that are applied to the provided part. Said otherwise, constraints related to the part are searched and identified in the database.

Typically, a constraint may be a geometrical constraint that assigns a relative position between geometries belonging to two different parts, e.g. the first and second parts. Geometries are geometrical elements such as point, line, curve or surface which are relevant for positioning. Hence, geometric constraint will maintain how two parts related to each other. For instance, a constraint may be parallelism between two planar surfaces of two parts. As another example, a constraint may be a coincidence between two cylindrical surfaces axis of two parts. An additional representation of a constraint may be distance between two points of two parts.

In practice, the database is a relational database that allows searching relations between parts and constraints stored on the database. A constraint stored in the database may typically comprise a type, a value, geometry of a part supporting the constraint. For instance, referring to a constraint that is be distance between two points of two parts, the type of the constraint is "distance", the value is a "number" representing how far apart geometries are, and the geometry is a given point of a given part.

Next, at step S30, geometries are retrieved from the database. The retrieved geometries are the geometries on which are applied the constraints identified at step S20. In practice, the identification of the geometries may be performed by using the relations of the database, e.g. the database is a relation database. In addition, as discussed above, a constraint may comprise information about the geometry of the part supporting the constraint. In practice, a constraint may be an object stored in the database that points on the part geometry on which constraint(s) is applied. This relation between the constraint and the geometry is thus shown in the database, and identification of the geometries may be performed by using the relations of the database.

Next, at step S40, it may be proposed to the user one or more constraints type for selection purpose. The one or more constraints type selected by the user may be used for computing the relative position of the first part relative to the second part, as it will be discussed below.

Practically, the proposed constraint types may be displayed ton the user in a dedicated user interface. In addition, the proposed constraint types may be combined and displayed; the combined constraint types may be sorted and displayed as a sorted list of combination of constraint types. For instance, in mechanic, standard links such as a pivot can be obtained from the combination of several elementary constraints.

Then, at step S50, it is computed at least one relative position of the first part and the second part by using the retrieved geometries. The computing may be carried out by a dedicated algorithm that deduces the constraints to be created from the retrieved geometries. The algorithm for deducing the constraints may rely on a heuristic that can typically be based on the most common constraints. The most common constraints can be optionally parameterized upon user action, or automatically selected by the system. For instance, for two axes, coaxiality is selected uppermost, and then parallelism or perpendicularity.

The already existing constraints stored in the database constitute knowledge of former geometrical constraints selected or accepted by designers, and the geometries maintained by these constraints are therefore representative of former selections made by the designer. In fact, the database acts as storage of the history of the design choices performed by the designer, and the constraints stored on the database therefore represents the history of the choices. Thus, the one or more geometries retrieved for each part are geometries used in existing solutions previously selected by the designer.

As a result, the computation of the at least one position is performed by reusing transparently the knowledge of the data base, thus advantageously allowing to accelerate the constraints creation process: indeed, geometries on which constraints are to be applied are deduced from the database, without requiring an explicit selection by the designer.

Practically, the computing of the at least one relative position may be performed by using the retrieved geometries together with a constraint type of the one or more constraints queried in the database for each part. This advantageously allows to accelerate the computation of the relative positions as the number of combinations of constraints types and retrieved geometries is less important.

Optionally, the computation may be performed according to one or more constraints type selected by the user. Again, the computation of the relative positions is accelerated as the number of combinations of constraints types and retrieved geometries is less important.

Referring now to FIGS. 2 to 8, it is discussed an example of design of an assembly of parts according to the invention.

Figure 3:
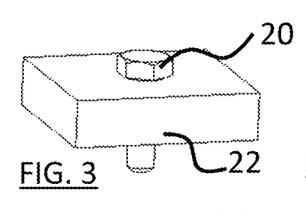
FIG. 3 shows a first assembly of parts stored in a database and comprising the screw of FIG. 2 on a support.
Figure 4:
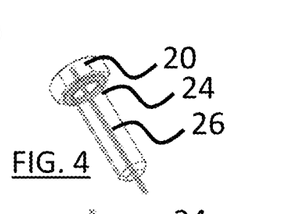
FIG. 4 shows geometries of screw of FIGS. 2 and 3.
Figure 5:
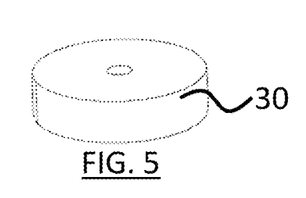
FIG. 5 shows a part representing a support.
Figure 6:
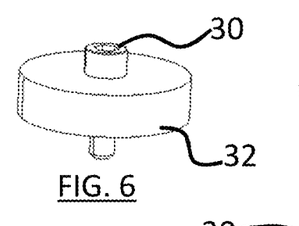
FIG. 6 shows a second assembly of parts stored in the database and comprising the support of FIG. 5 and a screw.

The assembly depicted on FIG. 3 is stored on a database and comprises two parts, namely a screw 20 that is inserted in the hole of a rectangular pad 30. The assembly depicted on FIG. 6 is stored on the database and comprises also two parts, a screw 30 that is inserted in the hole of a circular pad 32. Hence, these two assemblies already exit in a database. For each assembly of FIGS. 3 and 6, two constraints have been previously defined on the screw 20, 30, e.g. by a designer. These two constraints aim at to align the screw 20, 30 with the support 22, 32 hole and to maintain a contact between the support and the screw head. As a result, for each assembly of FIGS. 3 and 6, the screw 20, 30 is only allowed to rotate along its axis which is merged with the axis of the hole of the support.

Figure 2:
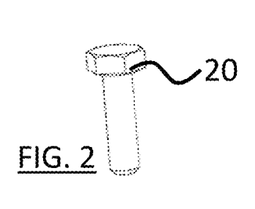
FIG. 2 shows a part representing a screw.

The user selects a first part, the screw 20 of the assembly of FIG. 3, represented on FIG. 2. Then the user selects a second part, the circular pad 32 of the assembly of FIG. 6, represented on FIG. 5.

As a result of the selection of the screw 20, a query is performed in the database for identifying the constraints applied on the screw. It is found that two constraints: (i) the first one to align the screw 20 with the hole of the support 22, and (ii) the second one maintain a contact between the support 22 and the head of the screw 20. It found in the database that the constraint (i) is applied on the axis of the screw, and that the constraint (ii) is applied on the lower surface of the screw head. Both geometries, the axis and the lower surface of the screw, are respectively represented by a dark line 26, 24 on FIG. 4.

Figure 7:
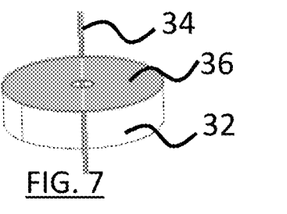
FIG. 7 shows geometries of support of FIGS. 5 and 6.
Figure 8:
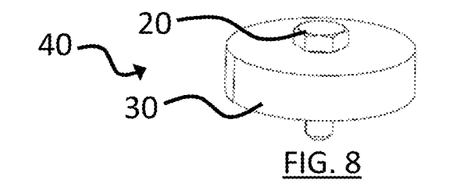
FIG. 8 shows an example of an assembly comprising the screw of the assembly of FIGS. 2 to 4 and the support of the assembly of FIGS. 5 to 6.

Similarly, the selection of the circular pad 32 triggers a query in the database. Two constraints are identified: (iii) the first one aligns the hole of the support 22 the screw 20 with, and (iv) the second one maintain a contact between the support 22 and the head of the screw 20. It is found in the database that the constraint (iii) is applied on the axis of the hole of the circular pad, and that the constraint (iv) is applied on upper surface of the circular pad. Both geometries, the axis and the upper surface of the pad, are respectively represented by dark stroke 34, 36.

Then, it is proposed to the user a list of geometrical constraints type, in which he/she may select one or more constraints. It is to be understood the selection is not mandatory and that the user may skip the selection step. Here, the user has selection a constraint type of contact. Consequently, the one or more relative positions of the screw and the circular pad will comprise at least one geometrical constraint of the type contact.

From the retrieved geometries, that is, the axis and the lower surface of the screw 20 and the axis and the upper surface of the pad 32, it is computed at least one relative position of the screw 20 with the pad 32. Constraints which should be created are computed from the retrieved geometries. In this example, the designer has selected geometrical constraint of the type contact. Furthermore, the relative positions may also be computed from the one of the constraints (i), (ii), (iii), (iv) identified in the database; here a geometrical constraint of type alignment.

It results that a proposed solution of relative position is the combination of two constraints. The first constraint is coincidence between the axis of the screw 26 of the screw 20 and the axis 34 of the hole of the circular pad 32. The second one is a contact between the lower surface 24 of the screw 20 and the upper surface 36 of the circular pad 32. The result of the computation may be represented to the user, as shown on FIG. 8: a new assembly 40 comprising the screw 20 and the circular pad 30 is displayed. This new assembly 40 has been created from geometries deduced from the database, these deduced geometries constitute knowledge of former choices made by designer(s). Thanks to the reuse of this knowledge of the former choices made by the designer(s), the most probable relative position(s) of the screw with respect to the circular pad has be computed, without requiring an explicit selection of geometries by the designer.

The invention may advantageously be implemented in one or more computer programs that are executable on a programmable system including at least one programmable processor coupled to receive data and instructions from, and to transmit data and instructions to, a data storage system, at least one input device, and at least one output device. The system may be computerized design system that comprises a storage system for storing at least the first and second parts, and a computing unit. The system may also comprise a haptic device for performing the selection of, but not limited to, a part, a constraint. The system may comprise a display for displaying an assembly of parts in a three-dimensional scene.

The application program may be implemented in a high-level procedural or object-oriented programming language, or in assembly or machine language if desired; and in any case, the language may be a compiled or interpreted language.

A computer program may comprise instructions, the instructions comprising means for causing the above system to perform the above method. The invention may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention has been described with reference to preferred embodiments. However, many variations are possible within the scope of the invention. For instance, when several relative positions are computed, they may be shown to the user in a specific order obtained from a ranking of the computed relative position. The ranking may be performed according to at least one criterion, that may be, but not limited to, a number of constraints between the first part and the second part of the assembly, a number of constraints suggested by a user between the first part and the second part of the assembly. As another example, a preview of the computed relative positions may be displayed in the 3D scene after the selection by the user of constraints, which allows the user to select then the constraint that matches with the expected relative position of the first part relative to the second one.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing a new assembly of parts in a three-dimensional scene, the parts being computer aided design (CAD) three-dimensional modeled objects, the three-dimensional scene being displayed in a graphical user interface (GUI), the GUI being coupled to a processor and, the method comprising:
   upon a first user action with the GUI, selecting at least a first part of an existing first assembly and, upon a second user action with the GUI, selecting, independently of the selected first part, a second part of an existing second assembly, the parts and the assemblies being stored in a relational database, the database storing a relation between the parts and one or more constraints that are applied on said parts, the first part and the second part being loaded in the three-dimensional scene;
   after both (i) selecting the first part upon the first user action with the GUI and (ii) selecting the second part upon the second user action with the GUI, then, for the first part:
      querying in the relational database for one or more first existing geometrical constraints applied to the first part and previously defined by a user in the stored existing first assembly, a given first existing geometrical constraint being stored in the relational database and indicating through a relation of the relational database a first part geometry on which the given first existing geometrical constraint is applied, the one or more first existing geometrical constraints assigning a relative position between first geometries belonging to the first part and another different part;
      automatically identifying, by the processor, first geometries of the first part on which the said one or more first existing geometrical constraints are applied by using relations in the relational database; and
      retrieving in the relational database the identified first geometries of the first part on which the said one or more first existing geometrical constraints are applied, the retrieved identified first geometries being representative of former design choices having been previously selected by a user;
   after both (i) selecting the first part upon the first user action with the GUI and (ii) selecting the second part upon the second user action with the GUI, then, for the second part:
      querying in the relational database for one or more second existing geometrical constraints applied to the second part and previously defined by a user in the stored existing second assembly, a given second existing geometrical constraint being stored in the relational database and indicating through a relation of the relational database a second part geometry on which the given second existing geometrical constraint is applied, the one or more second existing geometrical constraints assigning a relative position between second geometries belonging to the second part and another different part;
      automatically identifying, by the processor, second geometries of the second part on which the said one or more second existing geometrical constraints are applied by using the relations in the relational database; and
      retrieving in the relational database the identified second geometries of the second part on which the said one or more second existing geometrical constraints are applied, the retrieved identified second geometries being representative of former design choices having been previously selected by a user;
   then:
      computing, by the processor, at least one relative position of the first part and the second part that form a new assembly of parts by deducing constraints to be created between the first part and the second part from the retrieved first and second geometries, said computing resulting in forming the new assembly of parts; and
      rendering, in the three-dimensional scene, the formed new assembly of parts to the user.

2. The computer-implemented method of claim 1, wherein the step of computing at least one relative position comprises computing at least one constraint of the first part and the second part by using the retrieved first and second geometries and by using a constraint type of the one or more first and second existing geometrical constraints queried in the relational database for the first and second parts.

3. The computer-implemented method of claim 1, wherein the selecting of said at least first and second parts is performed upon the first user action on a haptic device and the second user action on the haptic device.

4. The computer-implemented method of claim 1, wherein the selecting of said at least first and second parts comprises:
   selecting the first part upon the first user action on a haptic device; and
   selecting the second part upon the second user action with the GUI, where the second user action with the GUI comprises hovering the selected first part that is dragged by the user over the second part.

5. The computer-implemented method of claim 1, wherein the said one or more first and second existing geometrical constraints stored in the relational database comprise at least one of:
   a type;
   a value; and
   a geometry of a part supporting the constraint.

6. A computer program product for execution by a computer, the computer program product for designing a new assembly of parts in a three-dimensional scene, the parts being computer aided design (CAD) three-dimensional modeled objects, the three-dimensional scene being displayed in a graphical user interface (GUI), the GUI being coupled to a processor and, the computer program product comprising:
   one or more computer-readable tangible storage devices and program instructions stored on at least one of the one or more storage devices, the program instructions, when loaded and executed by the processor, cause an apparatus associated with the processor to:
   implement, upon a first user action with the GUI, selecting at least a first part of an existing first assembly and, upon a second user action with the GUI, selecting, independently of the selected first part, a second part of an existing second assembly, the parts and the assemblies being stored in a relational database, the database storing a relation between the parts and one or more constraints that are applied on said parts, the first part and the second part being loaded in the three-dimensional scene;

after both (i) selecting the first part upon the first user action with the GUI and (ii) selecting the second part upon the second user action with the GUI, then, for the first part:
  query in the relational database for one or more first existing geometrical constraints applied to the first part and previously defined by a user in the stored existing first assembly, a given first existing geometrical constraint being stored in the relational database and indicating through a relation of the relational database a first part geometry on which the given first existing geometrical constraint is applied, the one or more first existing geometrical constraints assigning a relative position between first geometries belonging to the first part and another different part;
  automatically identify first geometries of the first part on which the said one or more first existing geometrical constraints are applied by using relations in the relational database; and
  retrieve in the relational database the identified first geometries of the first part on which the said one or more first existing geometrical constraints are applied, the retrieved identified first geometries being representative of former design choices having been previously selected by a user;
after both (i) selecting the first part upon the first user action with the GUI and (ii) selecting the second part upon the second user action with the GUI, then, for the second part:
  query in the relational database for one or more second existing geometrical constraints applied to the second part and previously defined by a user in the stored existing second assembly, a given second existing geometrical constraint being stored in the relational database and indicating through a relation of the relational database a second part geometry on which the given second existing geometrical constraint is applied, the one or more second existing geometrical constraints assigning a relative position between second geometries belonging to the second part and another different part;
  automatically identify second geometries of the second part on which the said one or more second existing geometrical constraints are applied by using the relations in the relational database; and
  retrieve in the relational database the identified second geometries of the second part on which the said one or more second existing geometrical constraints are applied, the retrieved identified second geometries being representative of former design choices having been previously selected by a user;
then:
  compute at least one relative position of the first part and the second part that form a new assembly of parts by deducing constraints to be created between the first part and the second part from the retrieved first and second geometries, said computing resulting in forming the new assembly of parts; and
  render, in the three-dimensional scene, the formed new assembly of parts to the user.

7. A non-transitory computer readable storage medium comprising:
a memory area having recorded thereon a computer program for designing a new assembly of parts in a three-dimensional scene, the parts being computer aided design (CAD) three-dimensional modeled objects, the three-dimensional scene being displayed in a graphical user interface (GUI), the GUI being coupled to a processor, and
the computer program including computer code for:
implementing, upon a first user action with the GUI, selecting at least a first part of an existing first assembly and, upon a second user action the GUI, selecting, independently of the selected first part, a second part of an existing second assembly, the parts and the assemblies being stored in a relational database, the database storing a relation between the parts and one or more constraints that are applied on said parts, the first part and the second part being loaded in the three-dimensional scene;
after both (i) selecting the first part upon the first user action with the GUI and (ii) selecting the second part upon the second user action with the GUI, then, for the first part:
  querying in the relational database for one or more first existing geometrical constraints related to the first part and previously defined by a user in the stored existing first assembly, a given first existing geometrical constraint being stored in the relational database and indicating through a relation of the relational database a first part geometry on which the given first existing geometrical constraint is applied, the one or more first existing geometrical constraints assigning a relative position between first geometries belonging to the first part and another different part;
  automatically identifying, by the processor, first geometries of the first part on which the said one or more first existing geometrical constraints are applied by using relations in the relational database; and
  retrieving in the relational database the identified first geometries of the first part on which the said one or more first existing geometrical constraints are applied, the retrieved identified first geometries being representative of former design choices having been previously selected by a user;
after both (i) selecting the first part upon the first user action with the GUI and (ii) selecting the second part upon the second user action with the GUI, then, for the second part:
  querying in the relational database for one or more second existing geometrical constraints related to the second part and previously defined by a user in the stored existing second assembly, a given second existing geometrical constraint being stored in the relational database and indicating through a relation of the relational database a second part geometry on which the given second existing geometrical constraint is applied, the one or more second existing geometrical constraints assigning a relative position between second geometries belonging to the second part and another different part;
  automatically identifying, by the processor, second geometries of the second part on which the said one or more second existing geometrical constraints are applied by using the relations in the relational database; and
  retrieving in the relational database the identified second geometries of the second part on which the said one or more second existing geometrical constraints are applied, the retrieved identified second geometries being representative of former design choices having been previously selected by a user;
then:

computing at least one relative position of the first part and the second part that form a new assembly of parts, said computing being by the processor and by deducing constraints to be created between the first part and the second part from the retrieved first and second geometries, said computing resulting in forming the new assembly of parts; and rendering, in the three-dimensional scene, the formed new assembly of parts to the user.

8. A computerized design system for designing a new assembly of parts in a three-dimensional scene, the parts being computer aided design (CAD) three-dimensional modeled objects, the three-dimensional scene being displayed in a graphical user interface (GUI), the GUI being coupled to a processor and, the computerized design system comprising:

a relational storage system for storing at least a first part of an existing first assembly, a second part of an existing second assembly, a relation between the parts and one or more constraints that are applied on said parts, and the assemblies;

a computing unit comprising the processor and configured to perform the steps of:

implementing, upon a first user action with the GUI, selecting at least the first part of the existing first assembly and, upon a second user action with the GUI, selecting, independently of the selected first part, the second part of the existing second assembly, the parts and the assemblies being stored in the relational storage system, the first part and the second part being loaded in the three-dimensional scene;

after both (i) selecting the first part upon the first user action with the GUI and (ii) selecting the second part upon the second user action with the GUI, then, for the first part:

querying in the relational storage system for one or more first existing geometrical constraints related to the first part and previously defined by a user in the stored existing first assembly, a given first existing geometrical constraint being stored in the relational storage system and indicating through a relation of the relational storage system a first part geometry on which the given first existing geometrical constraint is applied, the one or more first existing geometrical constraints assigning a relative position between first geometries belonging to the first part and another different part;

automatically identifying, by the processor, first geometries of the first part on which the said one or more first existing geometrical constraints are applied by using relations in the relational storage system; and retrieving in the relational storage system the identified first geometries of the first part on which the said one or more first existing geometrical constraints are applied, the retrieved identified first geometries being representative of former design choices having been previously selected by a user;

after both (i) selecting the first part upon the first user action with the GUI and (ii) selecting the second part upon the second user action with the GUI, then, for the second part:

querying in the relational storage system for one or more second existing geometrical constraints related to the second part and previously defined by a user in the stored existing second assembly, a given second existing geometrical constraint being stored in the relational storage system and indicating through a relation of the relational storage system a second part geometry on which the given second existing geometrical constraint is applied, the one or more second existing geometrical constraints assigning a relative position between second geometries belonging to the second part and another different part;

automatically identifying, by the processor, second geometries of the second part on which the said one or more second existing geometrical constraints are applied by using the relations in the relational storage system; and retrieving in the relational storage system the identified second geometries of the second part on which the said one or more second existing geometrical constraints are applied, the retrieved identified second geometries being representative of former design choices having been previously selected by a user;

then:

computing, by the processor, at least one relative position of the first part and the second part that form a new assembly of parts by deducing constraints to be created between the first part and the second part from the retrieved first and second geometries, said computing resulting in forming the new assembly of parts; and rendering, in the three-dimensional scene, the formed new assembly of parts to the user.

9. The computerized design system as claimed in claim 8, wherein the computing unit further performs, at the step of computing at least one relative position, computing at least one constraint of the first part and the second part by using the retrieved first and second geometries and by using a constraint type of the one or more first and second existing geometrical constraints queried in the relational storage system for the first and second parts.

10. The computerized design system as claimed in claim 8, wherein the said one or more first and second existing geometrical constraints stored in the relational storage system comprise at least one of:

a type;

a value; and a geometry of a part supporting the constraint.

11. The computerized design system of claim 8, further comprising a haptic device, wherein the selecting of said at least first and second parts is performed by:

selecting the first part upon the first user action on the haptic device; and selecting the second part upon the second user action with the GUI, where the second user action with the GUI comprises hovering the selected first part that is dragged by the user over the second part.

12. The computerized design system of claim 8, further comprising a display for rendering the new assembly of parts in the three-dimensional scene.

* * * * *